United States Patent [19]
Wagner et al.

[11] Patent Number: 5,761,602
[45] Date of Patent: Jun. 2, 1998

[54] HYBRID MULTICHANNEL DATA TRANSMISSION SYSTEM UTILIZING A BROADCAST MEDIUM

[75] Inventors: Larry Wagner, Orinda; Peter H. Moss, Lafayette, both of Calif.

[73] Assignee: Wagner DSP Technologies, Oakland, Calif.

[21] Appl. No.: 534,466

[22] Filed: Sep. 13, 1995

[51] Int. Cl.$^6$ .................................................. H04H 1/00
[52] U.S. Cl. ......................... 455/3.1; 455/5.1; 455/4.2; 348/6; 348/10; 348/12
[58] Field of Search ....................... 348/6, 7, 12, 13, 348/10, 11; 455/3.1, 5.1, 4.2, 6.1, 6.2, 6.3; H04N 7/16, 7/173

[56] References Cited

U.S. PATENT DOCUMENTS

| | | | |
|---|---|---|---|
| 4,677,685 | 6/1987 | Kurisu | 348/11 |
| 5,327,237 | 7/1994 | Gerdes | 348/476 |
| 5,347,304 | 9/1994 | Moura | 348/12 |
| 5,387,941 | 2/1995 | Montgomery | 348/473 |
| 5,512,935 | 4/1996 | Majeti | 348/12 |
| 5,621,729 | 4/1997 | Johnson | 348/13 |

OTHER PUBLICATIONS

"What is Teletext" by Marc Schneider on pp. 2–204 of the Desktop Video Data Handbook published by Philip Electronics North America Corporation, Jun. 1994.

"Digital Data Over Video Channels: Techniques for Spacelab," by Dean Lance Smith and Walter D. Hanley, IEEE Aerospace Electronic Systems Magazine (V8 N4, pp. 16–24), Apr. 1993.

"Routing in the Internet" by Christian Huitema, Chapter 13, Prentice Hall, 1995.

*Primary Examiner*—Sherrie Hsia
*Attorney, Agent, or Firm*—Gillin, Jacobson, Ellis, Larsen & Doyle

[57] ABSTRACT

The system and apparatus of the present invention includes, a triangular topology consisting of: 1) a distributor at the broadcast point which receives data and then transmits this data on the uni-directional broadcast channels, 2) a plurality of clients which receive this data and periodically connect to 3) a router which receives the requests and acknowledgments from the clients, and services these requests through its connections to remote systems such as networks, host computers, and the distributor.

20 Claims, 3 Drawing Sheets

HYBRID MULTICHANNEL DATA TRANSMISSION SYSTEM UTILIZING A BROADCAST MEDIUM

TECHNICAL FIELD

This invention relates generally to a hybrid data transmission system, and more particularly, it relates to providing a hybrid telephone/multichannel-television (TV) and/or FM broadcast transmission system for information distribution, datacasting and interactive data communications.

BACKGROUND ART

The growth and increasing popularity of the information superhighway has created a need for the transmission of high speed digital data to remote locations such as homes, offices and mobile sites. Data may consist of a variety of different types of information including for example, program files, data files, text, graphics, photographic images, audio and video clips (as distinguished from radio and TV programming).

Standard telephone lines, cellular networks and radio systems deliver data too slowly for many of the current applications. For example, compressed still video images in a digital format requires the delivery of a large amount of data, typically 5–50 kilo bytes. Downloading a typical Internet page with multiple GIF format images, which are already compressed, can take several minutes over a standard phone line with a 14400 baud or 28800 baud modem.

One existing solution is higher speed telephone lines, such as, ISDN lines and high speed broadband switched digital service offered by telephone companies. However, these higher speed services are sometimes expensive, often difficult to implement and not yet generally available to most consumers.

Many experts have stated that a cable TV system offers a promising way for remote users to gain relatively high speed access to corporate and popular data networks using the in-channel data capacity of cable TV systems. However for two-way communications, the roadblock has been that only about 5% of the existing North American cable TV systems can support bi-directional data flows sufficient for normal personal computer (PC) use.

Also, hybrid transmission systems have been proposed to handle high speed data broadcast. One example is U.S. Pat. No. 5,347,304 issued to Moura et al. This method proposes transmitting and receiving high speed digital information with a hybrid digital transmission system using a device at the remote site that receives analog broadcast TV-like signals. The high speed digital information is addressably broadcast using contiguous bandwidth in a television channel to the remote site. The device decodes the digital information from the signal and then passes it along as digital information to any form of data terminal equipment or computer.

In its preferred embodiment the Moura et al. method suffers from a number of deficiencies. In particular, an on-going bi-directional communications link, such as a bi-directional cable TV system, is required. At the present time less than 5% of all cable TV systems in the U.S. are bi-directional for such purposes. Additionally, the cost of converting existing uni-directional cable TV systems to bi-directional is estimated at $250 per cable subscriber. This is a significant cost which is likely to result in a very slow conversion to bi-directional cable TV systems. For a uni-directional cable system, an embodiment of Moura, et al. requires the constant use of a telephone modem as the reverse channel which may be objectionable. This on-going reverse channel requirement is for providing the traditional protocol scheme acknowledgments (i.e., ACK and NACK) and for requests.

Additional problems with the Moura et al. method include the fact that the digital data is broadcast using contiguous bandwidth in a single television channel. This implementation limits the available bandwidth for data transmissions and requires dedication of a single channel to data only. There is no provision for the user to be switched to another channel for additional bandwidth.

The present invention overcomes the problems in the aforementioned methods with an architecture that provides constant connectivity without an on-going reverse connection, without requiring contiguous bandwidth in a single channel, and by transmitting data over many channels utilizing variable sized bandwidth in each channel. This multichannel data transmission system is more appealing and can achieve higher data rates than the directly competitive basic rate ISDN alternative.

SUMMARY OF THE INVENTION

In a typical client-server, or other common end-user environment, 10-to-20 times or more data flows to the client than from the client. The client may be a computer, terminal or set-top box located at a remote site. The present invention eliminates the need for a viable reverse channel from the client through use of periodic, lower-speed, as needed connections.

In accordance with the illustrated preferred embodiment, the present invention provides a novel, cost effective hybrid multichannel data transmission system consistent with existing Internet and other current network architectures.

An object of the present invention is to provide a hybrid telephone/cable TV system method of data transmission that will deliver inexpensive remote connectivity which satisfies and surpasses the data communications needs of the 90% of the U.S. residences which are able to access cable TV.

Another object of the present invention is to utilize the universally underused data capacity of existing cable TV systems and the connections to existing home or office cable wiring.

Additionally, it is an object of the present invention to provide constant connectivity at low costs during prime-time or other hours without the requirement for an upstream connection unless data is required to be transmitted from the client.

It is also an object of the present invention to provide instantly scalable bandwidth through choice of an appropriately sized channel.

A further object of the present invention is to provide greater speed in remotely accessing remote networks, remote databases and the Internet via a simple, low-cost architecture.

Moreover, it is an object of the present invention to provide non-obtrusive access to switchable in-channel data capacity on cable TV systems.

The system of the present invention includes, briefly, a triangular topology consisting of: 1) a distributor at the broadcast point which receives data and then transmits this data on the uni-directional broadcast channels, 2) a plurality of clients which receive this data and periodically connect to 3) a router which receives the requests from the clients and all data destined to the clients, and services these through its connections to remote systems such as networks, host computers, and the distributor.

The present invention has other objects and advantages which are set forth in the description of the Best Mode of Carrying Out the Invention. The features and advantages described in the specification, however, are not all inclusive, and particularly, many additional features and advantages will be apparent to one of ordinary skill in the art in view of the drawings, specification, and claims herein.

BEST MODE OF CARRYING OUT THE INVENTION

Figure 1:
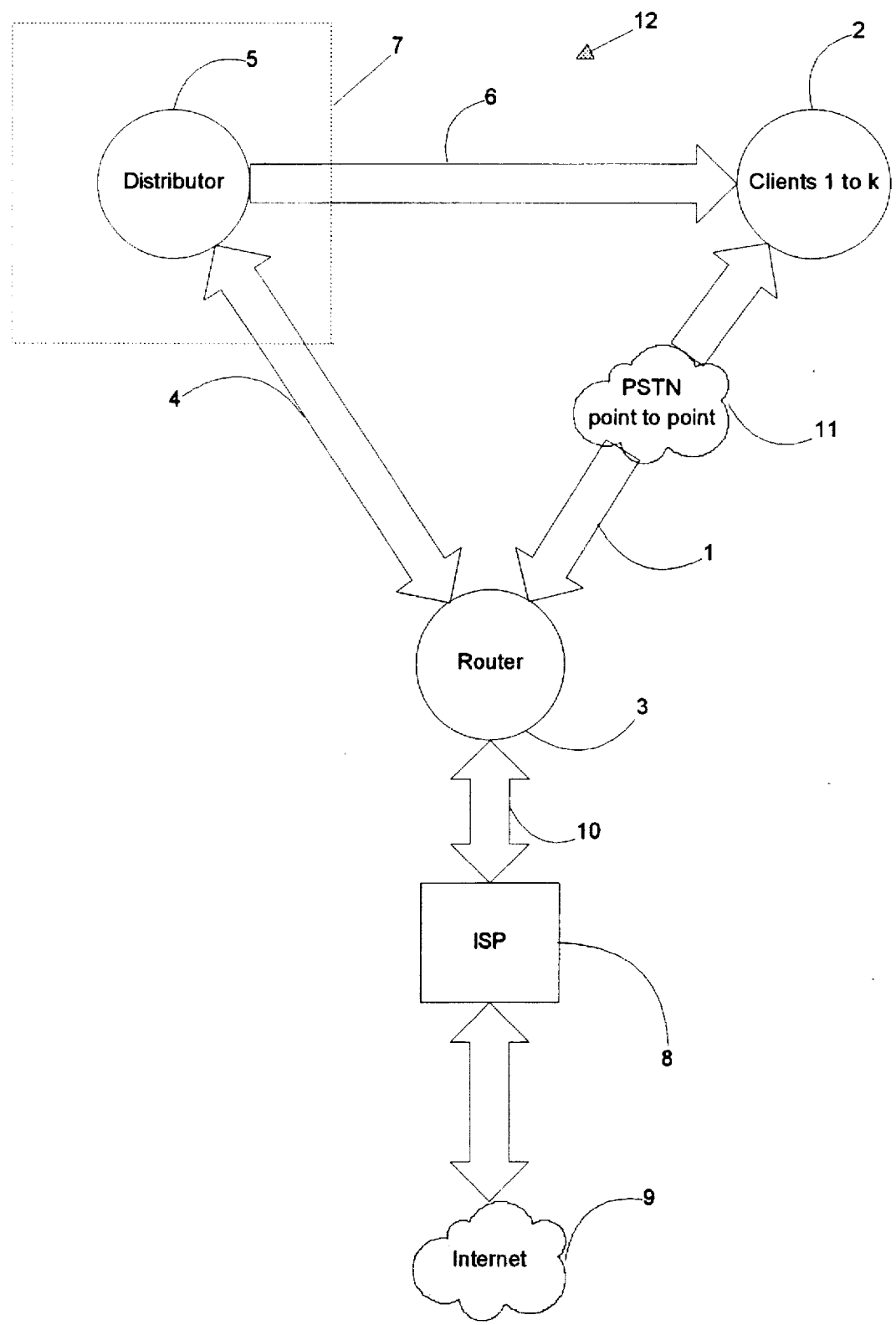
FIG. 1 is a functional block diagram of the best mode of the hybrid multichannel data transmission system utilizing a broadcast medium in accordance with the present invention.

The present invention employs a multichannel data transmission system that provides access to remote systems: the Internet, commercial on-line services, enterprise networks, common carrier networks and the like.

In the preferred embodiment using the Internet as an example, a client, such as a computer, terminal, set-top box device and the like, utilizes a triangular communications link. One of the links in the triangle is the traditional dial-up Internet communications link, telephone modems coupled point to point by a public switched telephone network (PSTN) with a relatively limited available bandwidth for data transmission. The client is linked to the router of an Internet service provider (ISP). Alternatively, if available, the upstream channel on a cable TV system can be used in place of the PSTN for purposes of an upstream channel. Another of the links in the triangle is a higher-speed broadcast link that is not traditionally used for data transmission. In the preferred embodiment this broadcast link is the cable TV broadcast from the cable TV system head-end to the cable TV subscribers which provides high data throughput. To complete the triangle, these two links are combined with a third high speed link between the router and the distributor at the cable TV system head-end.

Additionally, at the client is a modified television or radio receiver (implemented as a board in or attached to a computer or set-top box). At the cable TV system head-end a distributor controls a modified television or radio transmitter which can transmit data either on a full TV channel 6 Mhz RF modem, a partial TV channel (less than 6 Mhz bandwidth) RF modem, an FM radio data broadcast channel, or as a simultaneous data signal inserted in the raster scan lines of a normal television signal; either in the vertical blanking interval (VBI), or by using a data subcarrier or by other multiplexing means. Each client receiver is equipped with one or more tuners so that it can simultaneously receive data over one or several channels. The objective is to speed data transmission while making the hybrid data path transparent to the end-user.

The router may be a terminal server, network switch, an actual host or one of many types of routers. The router has a high speed dedicated link to a host called an Internet Service Provider (ISP). ISP is a node on the Internet. As used herein, all references to the Internet implies communication on a dedicated link to ISP and then to/from the Internet.

The router receives data packets from the Internet addressed to the clients and ordinarily transmits them not to the client but instead to the distributor. It also receives packets from the clients, when the link between the client and router exists, and passes them to the Internet. Upon each new dial-in using the popular point to point protocol (PPP), the router port on which the call arrives is dynamically assigned an Internet address which is associated with the client PPP sign-on and, in turn, with the address by which the client is permanently known by the distributor. Unsolicited messages such as E-mail are similarly correlated by associating the E-mail address to the address by which the client is permanently known by the distributor.

The distributor at the (cable, satellite or over the air broadcast) television (or radio) station or head-end acknowledges all transmissions from the Internet site router on behalf of its clients and itself (for administrative purposes) over a high-speed connection. Client-destined Internet responses and transmissions, as well as alerts, notifications and E-mail, are addressed to the appropriate client and inserted into a broadcast-stream for receipt by a specific client receiver. Ongoing analysis is performed by the distributor using a queuing management technique on all data traffic to be transmitted to clients so that on an only-as-needed-basis changes in channels or sub-channels or VBI lines in use are made for optimal system capacity balancing and client data through-put.

Changes in the appropriate channel are initiated by the distributor to the client which passively monitors its assigned channel(s) and waits to decode the address field of the broadcasted data. For an address match, the client receiver captures the transmitted data and presents it to the client processor. Changes in channels are preferably acknowledged by the client over the telephone link through the router to the distributor and so are not ordinarily made unless such a link exists. Since accommodating large file transmissions makes this embodiment desirable, if necessary, data that does not require high-speed broadcast transmission may be sent by the distributor through the router over an existing client telephone connection.

Additional details of the preferred embodiment are described in the context of a uni-directional cable TV broadcast system as the provider of the higher speed link. However, the present invention can be easily applied to other broadcast medium, such as direct broadcast satellite transmissions, standard over the air VHF or UHF television broadcasts, FM radio data broadcasts, and wireless cable (over the air microwave) systems, may be utilized to create to create the broadcast link. Additionally, if a bi-directional cable TV system is used, the telephone line return channel can be eliminated.

Figure 2:
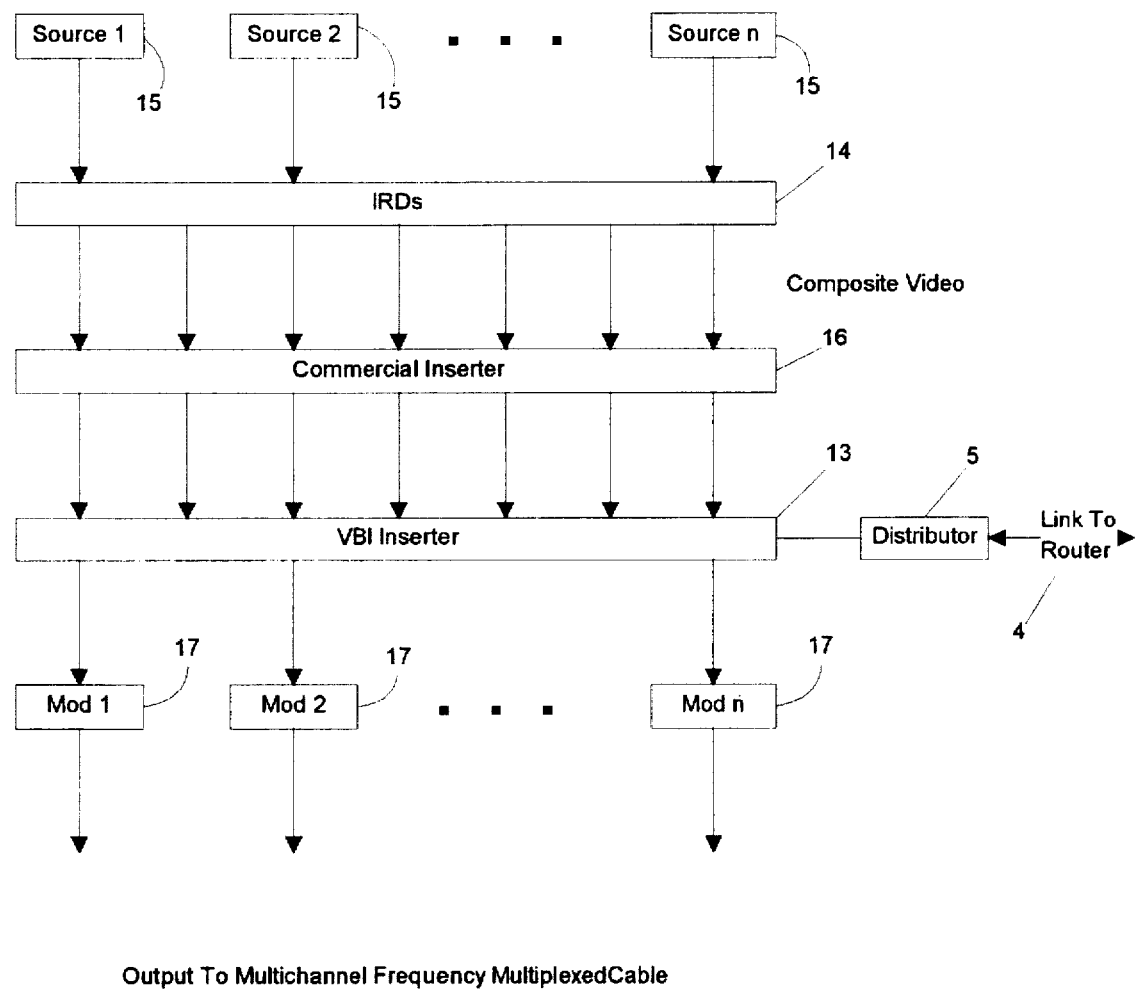
FIG. 2 is a functional block diagram of the head-end of the cable TV system portion of FIG. 1.
Figure 3:
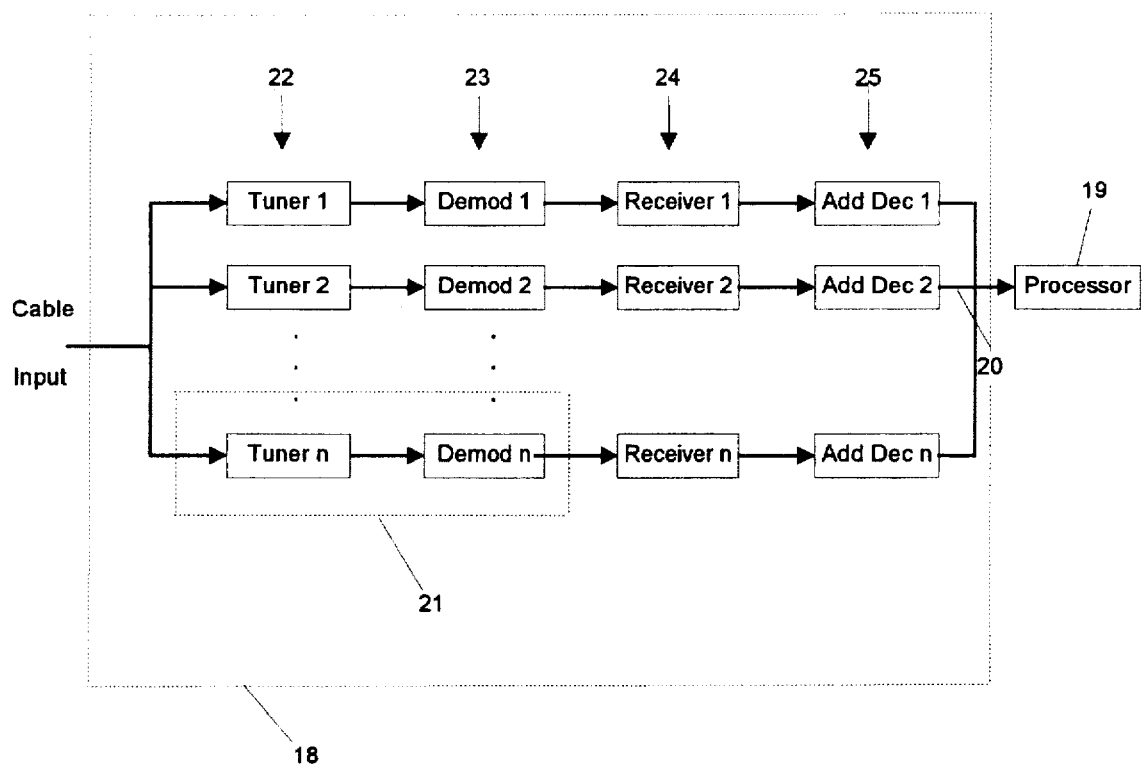
FIG. 3 is a functional block diagram of one of the clients shown in FIG. 1.

FIGS. 1 to 3 of the drawings depict the preferred embodiment of the present invention for purpose of illustration only. One skilled in the art will readily recognize from the following discussion that alternative embodiments of the structures and methods illustrated herein may be employed without departing from the principles of the invention described herein.

As depicted in FIG. 1, the triangular topology consists of three communications links. Namely, point to point telephone link 1 between each client 2 and router 3; distributor communications link 4 from router 3 to distributor 5; and uni-directional broadcast link 6 which transmits data inserted into the broadcast stream at cable head-end site 7 to clients 2. Distributor communications link 4 is preferably a high speed land line or other link if located remotely from the head-end. Internet service provider (ISP) 8, which is connected via a high speed link to the Internet 9, is coupled to router 3 via high speed dedicated link 10. Thus, ISP 8 is connected to clients 2 continuously through broadcast link 6 and occasionally through telephone link 1 as in those instances when a dial-up connection exists.

In the preferred embodiment, telephone link 1 is formed by an ordinary telephone modem connection over public switched telephone network 11, however other types of bi-directional communication links can be employed such as an ISDN line or cellular modem or bi-directional cable.

In order to enable a cable TV system 12 to utilize the present invention, dedicated hardware is installed for communicating with router 3 and for controlling the insertion of data into the broadcast signal. As shown in FIG. 2, distributor 5 is a personal computer that is coupled to VBI inserter 13 at cable head-end 7 of the residing cable TV system 12.

Cable head-end 7 of cable TV system 12 is configured in the conventional manner. Integrated receiver/decoders (IRDs) 14 receive and decode television signals from a variety of program sources 15, including satellite dishes, television antennas and microwave antennas. IRDs 14 output composite video signals which are received by commercial inserter 16 which are typically used for inserting local commercials into the television signal broadcast stream. The output of commercial inserter 16 is received by VBI inserter 13, which inserts data packets from distributor 5 into the VBI of the television signal. In alternate embodiments the data may be inserted using a horizontal blanking interval inserter or subcarrier multiplexing means. The output of VBI inserter 13 is received by modulators 17 which modulate the composite video signals onto the appropriate 6 MHZ TV channels. The modulated television signals are then combined and distributed onto the cable TV system which forms a multi-channel multiplexed communications link. In this manner, no modifications to the cable TV system are required. Only installation of the link to router 4, distributor 5 and VBI inserter 13 is needed.

At client 2 as shown in FIG. 3, a dedicated client add-in board 18 (or alternatively an external unit) is installed in client 2. Client board 18 connects directly to the cable TV system wires typically using a standard F-type co-axial connector. All downstream data communications from cable head-end 7 are received by client 2. Thus, client 2 forms the receiving end of broadcast link 6. Client board 18 communicates with the client processor 19 via an ISA or PCI bus 20 (alternately, via a high-speed local external serial or parallel connection in the case of an external unit being used in place of an add-in board).

Tuner assemblies 21, each comprising tuner 22 and demodulator 23, receive the RF input from the broadcast signal and output NTSC composite video. Tuner assemblies 21 tune to and demodulate the selected frequency modulated cable TV channels as instructed, so that VBI receiver 24 can process the received channels to extract the transmitted data packets. The extracted addressed data packets are then decoded by address decoder 25. If the address of the data packet matches the address of client 2, the data (w/o address) is transmitted to client processor 19 via bus 20. Since the data received via bus 20 will be presented in identical format to data normally received in a standard point to point modem connection by client processor 19 via a telephone modem (i.e., without the present invention), the inclusion of client board 18 is virtually transparent to client processor 19.

Thus, broadcast link 6 enables clients 2 to constantly receive data without the ongoing connectivity costs or telephone connections.

Client board 18 may include more than one tuner assembly 21, receiver 24 and address decoder 25. Utilizing more than one tuner assembly 21, receiver 24 and address decoder 25 enables client 2 to simultaneously receive data over more than one channel.

Upstream communications and optionally-selected downstream communications are transmitted via telephone link 1. Client 2 as a standard off the shelf modem 26 (not shown), such as a 14400 bps modem, which is capable of transmitting and receiving data via telephone link 1 to/from router 3. At router 3, multiple router modems 27 (not shown) enable router 3 to transmit and receive data from client modems 26 via telephone link 1 in a point to point manner.

In operation, upstream data transmissions, such as, keyboard entries, requests and file-uploads, are accomplished through client modems 26 via telephone link 1 to router modems 27 at router 3. Data from the Internet 9 can flow either through variable bandwidth of broadcast link 6 or, when available, back through telephone link 1.

Distributor 5 and broadcast link 6 components include software supporting client board 18 that operates in a WinSock environment running under a protocol stack, such as TCP/IP and PPP. A communications scheme, such as WinISDN or NDIS is utilized to interface client board 18 to client processor 19.

Cable TV system 12 broadcast transmissions consist of multichannel-multiplexed television broadcasts. Typically, the broadcast signals in the United States are in a NTSC-M format. Although other formats are available, such as B-MAC, Digicipher, and MPEG, federal regulation requires that cable TV system operators bring NTSC-M signals into homes to ensure compatibility with consumer televisions. Given the current predominance of NTSC-M broadcast transmissions, the downstream data communication in the preferred embodiment is described in this context. However, it would be readily apparent to one of ordinary skill that the present invention can be applied to the other broadcast formats. The format of the transmitted data is transparent to the transmission medium and format.

The downstream data may be transmitted in the vertical blanking interval (VBI) that exists within each channel. Typically, 20 lines of VBI at 15,000 bits per second per line using existing teletext technology. Client 2 can receive data packets on one or more VBI lines. An example of such a system is discussed in the application note titled "What is teletext" by Marc Schneider on page 2–204 of the Desktop Video Data Handbook published by Philip Electronics North America Corporation 1994. Thus, the data is present on existing industry-standard video transmission channels. A new transmission signal type does not have to be created.

Additionally, the most common cable TV system today is a 300 MHZ, 45 channel system. Generally, channels 41–45 are not used for the broadcast of any television programs, because most cable TV system equipment in use today results in poor video quality on those channels. Rather than purchasing costly equipment to make use of these channels, cable TV system operators often leave these channels vacant. Downstream data that is transmitted by the cable head-end transmitter via broadcast link 6 can be transmitted on these channels. Since no video is presently on the channel, the data transmission channel may use all available bandwidth of the channel (full channel data transmission). Data can be combined with normal TV in other ways, such as in the horizontal blanking interval (HBI) or adding a data subcarrier. Both methods are well known. Adding data to the HBI is discussed in "Digital Data over Video Channels:

Techniques for Spacelab," by Dean Lance Smith and Walter D. Hanby, IEEE Aerospace Electronic Systems Magazine (V8 n4, April 1993, pp. 16–24). Use of a data subcarrier is discussed in U.S. Pat. Nos. 5,327,237 and 5,387,941 assigned to Wavephore Corporation.

Due to restrictions by some program providers, and the fact that many national broadcasters use some of the lines in the VBI, not all channels are available for data to be inserted in the VBI. In a typical 45 channel cable TV system, approximately 20 channels may be available for the transmission of data in the VBI. Assuming that 5–10% of the customers are on-line to the Internet at peak time and 5% of those customers at any one instant are receiving data, a system using only the VBI of 20 video channels could support to approximately 8,000 customers. In the case where more channels and lines per channel are available, more than 8,000 customers can be supported. If a roll-off channel, that is the higher numbered channels whose carrier frequency is near the upper end of the broadcast spectrum at the cable TV system 12, or another full channel (not in the roll-off area) is available, approximately 40,000 more customers per available full channel capacity is gained using standard full channel (6 MHZ) cable modems with data rates of approximately 10 million bits per second.

While the preferred embodiment assumes that a full channel is not available, an alternate embodiment includes the use of one or more channels fully allocated to data transmission. In this case, the concept switching between multiple channels discussed in the context of the preferred embodiment is equally applicable. In this alternate embodiment, rather than using VBI inserters and receivers, cable modems are used to transmit and receive the downstream data at client 2.

Multiple channels on broadcast link 6 are available for the transmission of data packets to clients 2. The channels on which clients 2 receive data packets are switched in order to maximize the available VBI lines in all of the channels. In other words, client 2 does not always receive data on the same VBI lines in the same channel. Both the VBI lines and the channel are switched. The switching may take place from data message (i.e., a multiplicity of data packets which together form a single message) to data message or during the transmission of a single data message. Channel and VBI line switching is controlled by commands from distributor 5. The switching commands are received in any one or combination of the following manners: 1) via the general broadcast channel received by all clients 2; 2) via the last data transmission received by client 2; and/or 3) via telephone link 1. However, change without an existing telephone link is not desirable due to the lack of immediate acknowledgment.

Downstream communications are managed by distributor 5. The path taken by a data packet coming from the Internet 9 destined for a particular client 2 is determined by distributor 5. The VBI line and channel switching is transparent to ISP 8 and router 3. The selection of channel and line for data is determined by a technique queue management and based upon the availability of bandwidth, the priority of the data, average client waiting time, size of the data, and the type of transaction. Queuing theory as applied to data networks is well known. For example, Chapter 13 of "Routing in the Internet" by Christian Huitema (Prentice Hall 1995) describes some of these principles.

Distributor 5 performs intelligent data routing in the present invention. In particular, distributor 5: 1) places data on the appropriate channel on the cable head-end transmitter in either VBI, full channel, or other transmission spectrum; 2) determines and controls data channel switching and (for teletext) line allocation; and 3) optionally, in conjunction with router 3 determines whether to route data over broadcast link 6 or via telephone link 1.

Data integrity is also a function of distributor 5. Forward error correction is embodied in many teletext systems and would be utilized or improved-upon. Since there is no assurance and acknowledgment of data receipt by the client 2 without a then-current telephone connection, archiving all downstream transmissions to client 2 by the distributor 5 until acknowledgement is desirable. As telephone connections are again established, the client acknowledges receipt of data since the last telephone connection so that related archive data can be erased or, if necessary, retransmitted.

Any Internet data transmitted in response to requests from clients 2 are received by router 3. Router 3 transmits the data in the same manner as it always does except the data is transmitted to distributor 5 instead of via router modems 27 directly to clients 2. Distributor 5 then routes the data over broadcast link 6 to clients 2. In the event that distributor 5 determines the data should be transmitted via telephone link 1 (assuming the alternate embodiment is employed), distributor 5 instructs router 3 to transmit the data directly to client 2 via telephone link 1.

In order for client 2 to receive the incoming data via broadcast link 6, client 2 must be notified to tune to the channel on which the data will be broadcast. Alteratively, the commands may be transmitted via telephone link 1, or both for redundancy. In response to the command from distributor 5, client 2 sets tuner assembly 21 to the channel on which the data will be transmitted, receives the data with address on VBI receiver 24 and waits until an address match is found, by address decoder 25. Client 2 then receives the data addressed to it and passes this data to processor 19 via the bus 20.

Client board 18 constantly monitors the assigned broadcast channel or channels for incoming data transmissions or commands. This constant monitoring or scanning enables a continuous connection with ISP 8 without a dedicated, continuously open telephone line. Thus, at any time, client 2 can receive either a general message such as a newsflash or receive a message or commands addressed specifically to a particular client.

The channel on which a client 2 is instructed to receive transmitted data is switched as deemed necessary by Distributor 5. The receiving channel may be switched on as needed basis. The channel command is sent by distributor 5 over a current data channel. At the start of a new telephone session, a reference check is made to insure tuner 21 is tuned to the data channel expected by distributor 5. As a result of the data channel switching data is transmitted on multiple channels of non-contiguous, tunable (switchable) bandwidth which can be of variable size (i.e., 6 MHZ or less). The bandwidth is variable since each client 2 receives data based on the queue management techniques employed by distributor 5. This allows for a variable number of VBI lines and the use of multiple tuner assemblies on some clients for simultaneous reception of multiple simultaneous data streams.

Distributor 5 associates both upstream data transmissions and downstream data transmissions with an Internet address or other address of each of its clients 2. It must accommodate the lack of replies (i.e., ACK and NACK) to data and messages sent to each address via broadcast link 6 at those times when there is only a broadcast link 6 connection to a client 2. Whenever client software at client 2 reestablishes phone contact, distributor 5 automatically runs a procedure to validate all interim activity to ensure that all data has been completely received since last connectivity to distributor 5. By default, this may done late every evening, initiated by client software. For that reason, distributor 5 must ascertain that all data sent to client 2 via broadcast link 6 is retained until such validation occurs to enable re-transmission if necessary.

As a result, even though the cable TV system 12 is uni-directional, there is no need to tie up customers' telephone lines during the transmission of data to client 2. This is very advantageous when client 2 is frequently receiving unsolicited data such as E-mail or file downloads.

For example, a telecommuting worker may receive their next days workload via broadcast link 6 during the evening hours without tieing up their telephone line. Additionally, clients 2 may receive E-mail notifications and/or alerts without a telephone connection. The Internet service provider 8 perceives all clients 2 to be on-line at all times for E-mail because of the constant connectivity of broadcast link 6. Distributor 5 routes the data over broadcast link 6 allowing the customer to use the telephone line for other purposes.

From the above description, it will be apparent that the invention disclosed herein provides a novel and advantageous hybrid data transmission system. The foregoing discussion discloses and describes merely exemplary methods and embodiments of the present invention. One skilled in the art will readily recognize from such discussion that various changes, modifications and variations may be made therein without departing from the spirit and scope of the invention. Accordingly, disclosure of the present invention is intended to be illustrative, but not limiting, of the scope of the invention, which is set forth in the following claims.

We claim:

1. A data transmission system, comprising:

a plurality of clients at remote locations;

transmission means for transmitting broadcast signals in at least one broadcast channel to said remote locations;

distribution control means for controlling the distribution of downstream data to said clients;

inserter means responsive to said distribution control means for inserting said downstream data in said at least one broadcast channel;

router means for routing said downstream data received from remote systems and addressed to particular ones of said plurality of clients, said router routes said downstream data to said distribution control means;

first communications linking means for coupling said router means and said distribution control means; and a plurality of receiving means for receiving said downstream data from said broadcasting signals, each one of said plurality of receiving means being associated with one of said plurality of clients;

wherein said distribution control means transmits receiving instructions to said plurality of receiving means, said receiving instructions instruct said plurality of receiving means how to receive said downstream data addressed to said plurality of clients.

2. The system recited in claim 1, wherein said transmission means is a cable television system.

3. The system recited in claim 1 further comprising second communications linking means for selectively coupling said plurality of clients to said router means; wherein said downstream data from said remote systems is generated in response to upstream data generated at said plurality of clients and transmitted to said remote systems by said router means, said router means receives said upstream data from said clients via said second communications linking means.

4. The system recited in claim 3, responsive to said instructions from said distribution control means said router means transmits said downstream data either to said distribution control means for insertion into said broadcast signal or transmits said downstream data to said clients via said second communications linking means.

5. The system recited in claim 3, wherein said second communications linking means is a public switched telephone network.

6. The system recited in claim 1, wherein said broadcast signals comprise a plurality of raster scan lines; said inserter means inserts said downstream data in at least one of said raster scan lines of said broadcast signals; and said receiving instructions identify at least one of said raster scan lines to said receiving means.

7. The system recited in claim 6, wherein said raster scan lines include a plurality of vertical blanking interval lines and said inserter means inserts said downstream data in said vertical blanking interval lines.

8. The system recited in claim 7, wherein said distribution control means switches said vertical blanking interval lines in which said downstream data is transmitted.

9. The system recited in claim 1, wherein said at least one broadcast channel in which said inserter means inserts said downstream data is unoccupied by the broadcast signals.

10. The system recited in claim 1, wherein said transmission means has a plurality of broadcast channels and said distribution control means switches said at least one broadcast channel in which said downstream data is transmitted.

11. The system recited in claim 1, wherein said transmissions means has a plurality of broadcast channels and at least one of said plurality of said receiving means includes means for simultaneously receiving said downstream data on a multiplicity of said plurality of broadcast channels.

12. In a digital data transmission system in which digital data is addressably broadcast in at least one of the raster scan lines of a television channel to a client at a remote location, a receiving apparatus associated with said client comprising:

tuner means for tuning to and demodulating a broadcast signal;

receiver means coupled to said tuner means for extracting said data from said at least one of the raster scan lines of the demodulated broadcast signal;

decoder means for decoding the address of said data from said receiver means to verify an address and obtain said data;

control means responsive to external control signals transmitted to said client for commanding said receiver means to extract said data from said at least one of the raster scan lines.

13. The apparatus recited in claim 12 further comprising means for simultaneously receiving said data on a multiplicity of television channels.

14. The apparatus recited in claim 12, wherein said at least one of said raster scan lines in which said data addressed to said client is transmitted is switched during the transmission of said data, and said external control signals cause said control means to command said receiver means to switch said at least one of raster scan lines on which said receiver apparatus receives said data.

15. The apparatus recited in claim 12, wherein said receiver means receives said data in at least one vertical blanking interval line of said at least one of the raster scan lines.

16. In a digital data transmission system in which digital data is addressably broadcast in at least one broadcast transmission channel to a client at a remote location, a receiving apparatus associated with said client comprising:

a tuner means for tuning to and demodulating a broadcast signal;

a receiver means coupled to said tuner means for receiving said data from said broadcast channel of the demodulated broadcast signal;

a decoder means for decoding the address of said data from said receiver means to verify an address and obtain said data;

a control means responsive to external control signals transmitted to said client for commanding said tuner means to tune to said at lease one broadcast channel containing said data.

17. The apparatus recited in claim 16 further comprising means for simultaneously receiving said data on a multiplicity of broadcast transmission channels.

18. The apparatus recited in claim 16, wherein said at least one broadcast transmission channel in which said data addressed to said client is transmitted is switched during the transmission of said data and said control means to command said tuner means to switch from said at least one broadcast channel on which said receiver apparatus receives said data.

19. In a un-directional broadcasting system in which broadcast signals are transmitted from a broadcast point to a plurality of remote locations, a digital data transmission subsystem comprising:

a distribution control means at said broadcast point for controlling the transmission of downstream data to said plurality of remote locations with said broadcast signals; and a plurality of clients at said remote locations, said plurality of clients receive said downstream data with said broadcast signals and for generating upstream data; and a router means for receiving said upstream data from said clients and for transmitting said downstream data to said distribution control means;

wherein there is no immediate reverse channel between said distribution control means and said clients to acknowledge receipt of said downstream data by said clients during the transmission of said downstream data.

20. The subsystem recited in claim 19, further comprising:

storage means for storing a record of said transmission of said downstream data to said clients;

wherein at a time subsequent to said transmission of said downstream data to said clients, said clients transmit data to said distribution control means acknowledging receipt of said downstream data.

* * * * *